US 8,266,262 B2

(12) United States Patent
Relyea

(10) Patent No.: US 8,266,262 B2
(45) Date of Patent: Sep. 11, 2012

(54) PROVIDING NETWORK SECURITY SERVICES FOR MULTIPLE REQUESTERS

(75) Inventor: Robert Relyea, Sunnyvale, CA (US)

(73) Assignee: Red Hat, Inc., Raleigh, NC (US)

( * ) Notice: Subject to any disclaimer, the term of this patent is extended or adjusted under 35 U.S.C. 154(b) by 290 days.

(21) Appl. No.: 12/627,876

(22) Filed: Nov. 30, 2009

(65) Prior Publication Data

US 2011/0131303 A1 Jun. 2, 2011

(51) Int. Cl.
*G06F 15/177* (2006.01)
(52) U.S. Cl. ......... 709/222; 709/225; 709/229; 370/230
(58) Field of Classification Search .................. 709/213, 709/222; 370/352
See application file for complete search history.

(56) References Cited

U.S. PATENT DOCUMENTS

| 7,240,143 | B1 * | 7/2007 | Scheffler et al. .................. 711/3 |
| 2003/0076870 | A1 * | 4/2003 | Moon et al. .................... 375/130 |
| 2004/0039827 | A1 * | 2/2004 | Thomas et al. ............... 709/228 |
| 2007/0002838 | A1 * | 1/2007 | Komura et al. ............... 370/352 |
| 2007/0283422 | A1 * | 12/2007 | Iyoda et al. ....................... 726/4 |
| 2009/0037121 | A1 * | 2/2009 | Muralidharan et al. ........ 702/35 |
| 2009/0300027 | A1 * | 12/2009 | Matsunaga et al. ............. 707/10 |
| 2010/0076988 | A1 * | 3/2010 | Kenedy et al. ................ 707/757 |
| 2010/0082541 | A1 * | 4/2010 | Kottomtharayil ............. 707/634 |
| 2010/0161751 | A1 * | 6/2010 | Stewart ......................... 709/213 |
| 2010/0235413 | A1 * | 9/2010 | Patel et al. .................... 707/825 |
| 2011/0125642 | A1 * | 5/2011 | Kamal ........................... 705/44 |

* cited by examiner

*Primary Examiner* — Wing Chan
*Assistant Examiner* — Tesfay Yohannes
(74) *Attorney, Agent, or Firm* — Lowenstein Sandler PC

(57) ABSTRACT

A security initialization system receives a first initialization request from a first requester to access a first database storing security data and stores context data for the first initialization request that identifies an initialization operation associated with the first database. The security initialization system receives a second initialization request from a second requester to access a second database storing security data and updates the context data to identify an initialization operation associated with the second database. The security initialization system receives a shut down request from one of the requesters, where the shut down request includes data for identifying a corresponding initialization operation in the context data. The security initialization system updates the context data to show that the corresponding initialization operation has a shut down request and determines whether a security module is to be shut down using the context data.

20 Claims, 4 Drawing Sheets

PROVIDING NETWORK SECURITY SERVICES FOR MULTIPLE REQUESTERS

RELATED APPLICATION

The present application is related to co-filed U.S. patent application Ser. No. 12/627,865 entitled "Using a PKCS Module for Opening Multiple Databases", which is assigned to the assignee of the present application.

TECHNICAL FIELD

Embodiments of the present invention relate to establishing secure connections in a network. Specifically, the embodiments of the present invention relate to a method and system for providing network security services to multiple requesters.

BACKGROUND

A server and a client can be protected such as with a secure socket layer (SSL) connection between the server and client. SSL is a protocol that provides security for communications over networks such as the Internet. A server may obtain a certificate for allowing an encryption key to be generated for establishing the SSL connection with a client. A certificate can contain the name of the server or other entity that is being identified, the server's public key, the name of the issuing CA, and other information proving that the certificate is authenticated. When a certificate is issued, the certificate and certificate information are typically stored in one or more databases. Other information may include a public key, a private key for decrypting encrypted content, and/or whether or not a certificate is trusted for a particular purpose (trust information). For example, a user may wish to view an encrypted email message received by the user and a client email application can search for the private key to decrypt the email.

The key may be associated with a particular cryptographic standard, such as public key cryptography standard (PKCS), for example, the PKCS #11 industry standard. An application, such as a web browser or an email application, can construct a request for the key through a security module, such as a network security services (NSS) module. Typically, applications identify the database to be opened in the request and initialize NSS to open the particular database to provide SSL services.

The application can also call different system library services, such as for HTTP operations, LDAP operations, etc. The system libraries may also initialize NSS for NSS to provide SSL services. When NSS is initialized, NSS causes a module to open a database, such as a database storing a key. However, when NSS is running as a result of a first initialization by a library or an application, NSS is unable to open another database for any subsequent initialization requests. An application and library, therefore, are unable to access another database until NSS is shut down and re-initialized.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for providing network security services to multiple requesters. A security initialization system receives a first initialization request from a first requester to access a first database storing security data and stores context data for the first initialization request that identifies an initialization operation associated with the first database. The security initialization system receives a second initialization request from a second requester to access a second database storing security data and updates the context data to identify an initialization operation associated with the second database. The security initialization system receives a shut down request from one of the requesters, where the shut down request includes data for identifying a corresponding initialization operation in the context data. The security initialization system updates the context data to show that the corresponding initialization operation has a shut down request and determines whether a security module is to be shut down using the context data.

Embodiments of the present invention can receive a request for network security services (NSS) from multiple requesters and can provide network security services in response to each request. For example, an HTTP library can request access to security data in a first database and the initialization system can initialize NSS to cause the first database to open. Subsequently, an email application can request access to security data in a second database and the initialization system can cause the second database to open. Embodiments of the present invention can store and maintain context data that identifies an initialization operation associated with each open database. The initialization system can use the context data to determine whether to shut down a network security services (NSS) module. For example, the initialization system can search the context data to determine whether a shut request was received for the initialization operation associated with the first database and whether a shut down request was received for the initialization operation associated with the second database. The initialization system can shut down the NSS module when shut down requests were received for all of the initialization operations.

Figure 1:
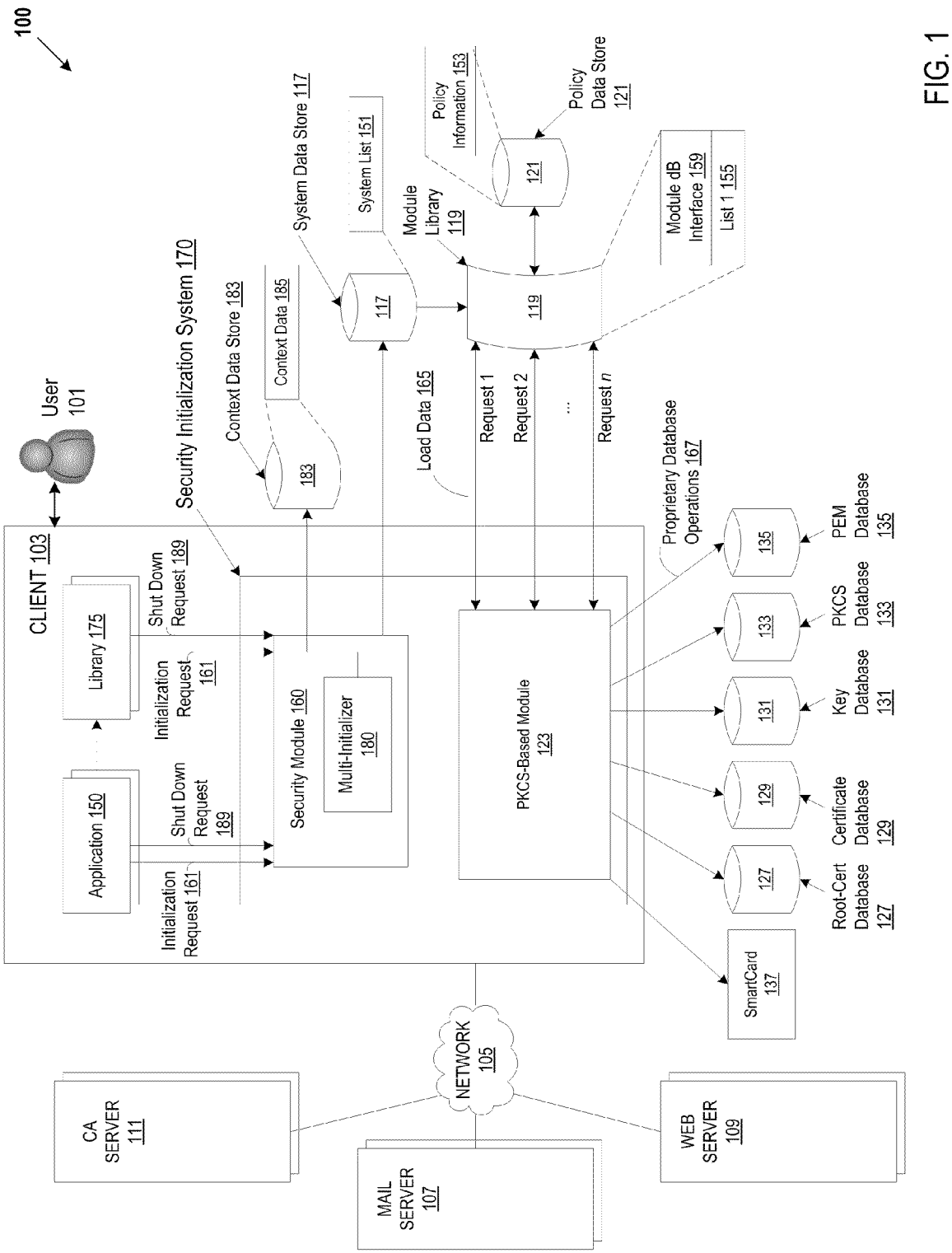
FIG. 1 illustrates an exemplary network architecture in which embodiments of the present invention may operate.

FIG. 1 illustrates an exemplary network architecture 100 on which embodiments of the present invention can be implemented. The network architecture 100 can include one or more servers, such as mail servers 107 to process mail requests for a user 101, and one or more web servers 109 to provide web content to a user 101. The network architecture 100 can also include one or more Certificate Authority (CA) servers 111 that issue digital certificates for use by other parties, such as a user 101 or a server 107-109.

A client device 103 for a user 101 is coupled to a network 105. A user 101 can use the client device 103 to access data, such as web content or email content, hosted by a server, such as a web server 109 or a mail server 107. The user 101 can access the data using a general purpose browser or a specialized application 150. An application 150 can be a web browser, a cryptography application, an email client, or the like. The application 150 may need access to security data to enable a user to view the email message or web content. For example, an application 150 may be an email application which requires a key to decrypt an email message. An application 150 can also call different system library services 175, such as for HTTP operations, LDAP operations, etc. The system libraries 175 may also need access to security data for SSL services.

Security data can be stored in a data storage system. A data storage system can include data stores, file systems, tokens (e.g., a smartcard), etc. A database is an example of a data store. Examples of security data include a root-certificate stored in a root-certificate database 127, a user certificate stored in a certificate database 129, a key stored in a key database 131, PKCS #11 objects stored in a PKCS database 133, PKCS #11 objects stored in a smartcard 137, a Privacy Enhanced Mail (PEM) file stored in a PEM database 135, a system list 151 or user list of PKCS #11 modules, etc. The databases may be part of the client computer 103 or may reside on a separate computer and accessed via network 105.

When a need for security data arises in an application 150 and/or a library 175, access to the security data can be provided through a security initialization system 170. A client device 103 can include a security initialization system 170 for opening databases that store the security data based on user-configurable policy information 153. The policy information 153 can be stored in a policy data store 121.

The initialization system 170 can include a security module 160 and a PKCS-based module 123 (e.g., PKCS #11-based modules). In cryptography, public key cryptography standard (PKCS) refers to a group of public key cryptography standards. Security data may be stored on a hardware cryptographic token (e.g., a smart card, USB flash drive, etc.). PKCS #11 is the Cryptographic Token Interface standard that specifies an API defining a generic interface to a cryptographic token. The security module 160 can cause the PKCS-based module 123 to open and close databases.

The network architecture 100 can also include a context data store 183 storing context data 185, a system data store 117 storing a system list 151, and a module library 119 that includes a module database (dB) interface 159. This division of functionality is presented by way of example for sake of clarity. One skilled in the art would understand that the functionality described could be combined into a monolithic component or sub-divided into any combination of components.

An application 150 and/or a library 175 can request access to security data (e.g., a key) using a security module 160, such as a network security services (NSS) module, made accessible through an operating system, such as by providing an application programming interace (API) or the like. An application 150 and/or a library 175 can generate an initialization request 161. The request 161 is received by the security module 160. It will be appreciated that the security module includes a set of libraries for supporting security-enabled client and server application.

The security module 160 can include a multi-initializer 180 for receiving multiple requests to initialize the security module 160 and to cause a database storing security data to open for each request. The multi-initializer 180 can also manage the shut down of the security module 160. The multi-initializer 180 can receive an initialization request 161 from a first requester, such as an application 150 or a library 175, to access a first database storing security data (e.g., one of databases 127-135). For example, a library 175 may first request access to security data that is stored in the certificate database 129. The multi-initializer 180 can receive the library's 175 request and can initialize the security module 160 to cause the certificate database 129 to be opened. The multi-initializer 180 can receive a second initialization request 161 from a second requester, such as an application 150 or a library 175, to access a second database storing security data (e.g., one of databases 127-135). For example, an application 150 can request access to security data that is stored in another database, such as a key database 131. The multi-initializer 180 can receive the application's 150 request, can detect that the security module 160 is already initialized from the previous request made by the library 175, and can cause a PKCS-based module 123 to open the key database 129 without shutting down the security module 160. The multi-initializer 180 can also receive multiple requests to initialize the security module 160 to open the same database and optimize the multiple requests by opening the database with a single initialization operation.

The multi-initializer 180 can also store and maintain context data 185 for each initialization request, for example, in a persistent storage unit 183. The context data 185 can include data that identifies an initialization operation that is associated with a database to be opened. An initialization operation can be identified by a unique identifier. For example, an HTTP library can generate an initialization request to access data stored in database-A and cause an initialization operation to open database-A. In addition, an LDAP library can also generate an initialization request to access data stored in a different database, database-B, and a web browsing application can generate an initialization request to access data stored in database-C. The context data 185 can include data identifying that database-A, database-B, and database-C are open, and data pertaining to the three initialization operations, each initialization operation having a unique identifier and being associated with an open database.

The context data 185 can include a reference count for a database to track multiple opens of the database. For example, an application 150 may request request access to security data that is stored in a database, such as a key database. The multi-initializer 180 can receive the application's request and can initialize the security module 160 to cause the key database 131 to be opened. A library may also request access to the same key database 131. The multi-initializer 180 can receive the library's request, can detect that the security module 160 is already initialized from the previous request made by the application, and can use a reference count to record the second request to open the key database 131.

The multi-initializer 180 can use the context data 185 to manage the shut down of the security module 160. A requester, such as an application 150 or a library 175, that is done accessing the open databases can generate a shut down request 189. The shutdown request 189 may include data that identifies the requester, a database, and/or an initialization operation. The multi-initializer 180 can use data in the shutdown request to identify an initialization operation in the context data that corresponds to the shutdown request. For example, the LDAP library may be done accessing security data in the open databases and can generate a shut down request 189 that includes the identifier for its initialization operation. The shutdown request 189 may include data that identifies the requester (e.g., an application 150 or a library 175) and/or a database. The multi-initializer 180 can determine an initialization operation that corresponds to the shut down request 189 using the database and/or requester information.

The multi-initializer 180 can receive the shut down request 189 and update the context data 185 to reflect the shut down request. For example, the context data 185 can be updated to show that an initialization operation identified in the shut down request from the LDAP library is shut down. The multi-initializer 180 can search the context data for a matching identifier and can delete the initialization operation data in the context data or can change the initialization operation data to show that it is shut down.

The multi-initializer 180 can determine from the context data 189 whether there are other requesters, such as applications 150 or libraries 175, that are still accessing the open databases. For example, the multi-initializer 180 can determine whether the HTTP library and web browsing application are still accessing database-A, database-B, and database-C. The multi-initializer 180 can examine the context data to determine whether all of the initialization operations in the context data have been shut down. In one embodiment, the open databases can remain open until the multi-initializer 180 detects that all initialization operations have corresponding shut down requests. When the multi-initializer 180 detects that all initialization operations have corresponding shut down requests, the multi-initializer 180 can shut down the security module 160 and cause the open databases to close. The security module 160 can cause the PKCS-based module 123 to close the open databases. For example, database-A, database-B, and database-C can remain open until the other requesters (e.g., applications 150 and libraries 175) each generate and send a shut down request 189 indicating that a requester is done accessing the opened databases.

In another embodiment, a shut down request 161 can identify an initialization operation used to open a database and the multi-initializer 180 can cause the open database associated with the initialization operation to close. For example, the LDAP library may be done accessing security data in the database-B and can generate a shut down request 189 that includes the identifier for its initialization operation (or a database and requester identifier) which is associated with database-B. The multi-initializer 180 can determine whether all initialization operations for the particular database (e.g., database-B) have corresponding shut down requests. The multi-initializer 180 can use the reference count in the context data 185 for determining whether all initialization operations for the particular database (e.g., database-B) have corresponding shut down requests. When the multi-initializer 180 detects that all initialization operations for the particular database have corresponding shut down requests, the multi-initializer 180 can cause the open database (e.g., database-B) to close. The multi-initializer 180 can cause the PKCS-based module 123 to close database-B without shutting down any other open databases.

To open a database that stores the security data in response to detecting an initializaton request 161, the security module 160 can access a system data store 117 to determine which database to open. The system data store 117 can store data (e.g., a system list 151) that identifies a module library 119. The module library 119 can store a module dB interface 159. The module dB interface 159 can obtain user-configurable policy information 153, for example, stored in a policy data store 121. The policy data store 121 can be a lightweight data access protocol (LDAP) based database. The LDAP-based database can be locally stored on may be part of a server (not shown) accessed via network 105. The policy information 153 can identify a database to be opened for a particular request 161 based on server type (e.g., web server, mail server), application type (e.g., email application, web browser), application name (e.g., Internet Explorer®, Firefox®), and user (e.g., root-user, administrative user). The policy information 153 can be configured by a user, such as a system administrator.

In another embodiment, the security module 160 can determine which database to open for a particular request 161 from module data that can be included in the module dB interface 159. Module data can include operating system specific lists (e.g., list 155) that identify databases to be opened for a particular initialization request 161. For example, list 155 can be a list for the Linux operating system that identifies the certificate database 129 and the root-certificate database 127 as the databases to open for a particular initialization request 161.

The security module 160 can cause a PKCS-based module 123 to be initialized for opening a database identified by the user-configurable policy information 153 or the module data (e.g., list 155). The module dB interface 159 can generate load data based on the the user-configurable policy information 153 or the module data and can send the load data 165 to the PKCS-based module 123. The load data 165 can include the name of the database to be opened, the location of the database, and the access type for the database (e.g., read, write, read/write).

PKCS #11 provides an interface to one or more cryptographic devices that are active in a system (e.g., client 103) through a number of "slots" (not shown). Typically, each slot corresponds to a physical reader or other device interface for a token. A system may have some number of slots, and an application 150 can connect to tokens in any or all of those slots. PKCS #11 provides the interface to access a token through a slot.

A database storing security data or a file on disk storing security data may be perceived as a software token. The module dB interface 159 can send load data 165, which identifies which database to open, to the PKCS-based module 123. The module dB interface 159 can cause the PKCS-based module 123 to initialize for opening the database identified in the load data 165. When the PKCS-based module 123 is initialized, the PKCS-based module opens a slot for opening the database, which enables an application 150 to access the database using the opened slot.

For each database to be opened, the module dB interface 159 can send a request that includes the load data 165 to the PKCS-based module 123. For example, the module dB interface 159 can send a Request 1 to initialize the PKCS-based module 123 to cause a database, such as a certificate database 129, to open, for example, with read/write access. The load data 165 may be in a format according to the PKCS#11 industry standard. The PKCS-based module 123 can receive the load data 165 and can translate the load data 165 into a proprietary database operation 167 to cause the database (e.g., certificate database 129) to open. Examples of the PKCS-based module 123 can include a PEM module for opening PEM databases (e.g., PEM database 135) or can be a soft-token module for opening user databases and system databases. Privacy Enhanced Mail (PEM) is a protocol for securing email using public key cryptography.

Policy information 153 or module data may identify more than one database to be opened and the PKCS-based module 123 may receive more than one request to open a database (e.g., Request 1 to Request n). The PKCS #11 standard, however, allows a module to be initialized once, and while the module is running, other calls to use the module will produce an error. For example, after the PKCS-based module 123 is initialized in response to Request 1, which opened the certificate database 129 with read/write access, the PKCS-based module 123 may receive Request 2 to open a different database, such as a key database 131 with read/write access, while the PKCS-based module 123 is still running.

The PKCS-based module 123 can generate an error (e.g., error code) indicating that the PKCS-based module 123 is already initialized (opened). Since the PKCS-based module 123 is already initialized, the PKCS-based module cannot open a slot to enable an application 105 to access a database (e.g., key database 131) for Request 2. The security module 160 can detect the error (e.g., error code) to determine that the PKCS-based module 123 is already initialized. In response to determining that the PKCS-based module 123 is already initialized, the security module 160 can cause the PKCS-based module 123 to create a slot to open the database (e.g., key database 131) which would enable an application 150 to access the opened database. For an additional request, such as Request n, the PKCS-based module 123 can create an additional slot to open a database for Request n. The PKCS-based module 123 can create one slot for each database to be opened.

A CA server 111, mail server 107, and web server 109 can be any type of computing device including server computers, desktop computers, laptop computers, hand-held computers, or similar computing device. A client device 103 can be a smart hand-held device or any type of computing device including desktop computers, laptop computers, mobile communications devices, cell phones, smart phones, hand-held computers or similar computing device capable of transmitting certificate requests and receiving certificates. The network 105 can be a wide area network (WAN), such as the Internet, a local area network (LAN), such as an intranet within a company, a wireless network, a mobile communications network, or a similar communication system. The network 105 can include any number of networking and computing devices such as wired and wireless devices.

Security data can be stored in databases (e.g., root-certificate database 127, certificate database 129, key database 131, PKCS database 133, PEM database 135) in one or more persistent storage units. These databases may be separate or combined databases. System lists 151 can be stored in a system data store 117 in a persistent storage unit. User-configurable policy information 153 can be stored in a policy data store 121 in a persistent storage unit. A data store can be a table, a database, a file, etc. A module dB interface 159 can be stored in a module library 119 in a persistent storage unit. A persistent storage unit can be a local storage unit or a remote storage unit. Persistent storage units can be a magnetic storage unit, optical storage unit, solid state storage unit or similar storage unit. Persistent storage units can be a monolithic device or a distributed set of devices. A 'set,' as used herein, refers to any positive whole number of items.

The security module 160, the multi-initializer 180, the PKCS-based module 123, and the module dB interface 159 can be implemented as hardware, computer-implemented software, firmware or a combination thereof. In one embodiment, the security module 160, the multi-initializer 180, the PKCS-based module 123, and the module dB interface 159 comprise instructions stored in memory 304 that cause a processing device 302 in FIG. 3 described in greater detail below to perform the functions of the security module 160, the multi-initializer 180, the PKCS-based module 123, and the module dB interface 159.

Figure 2A:
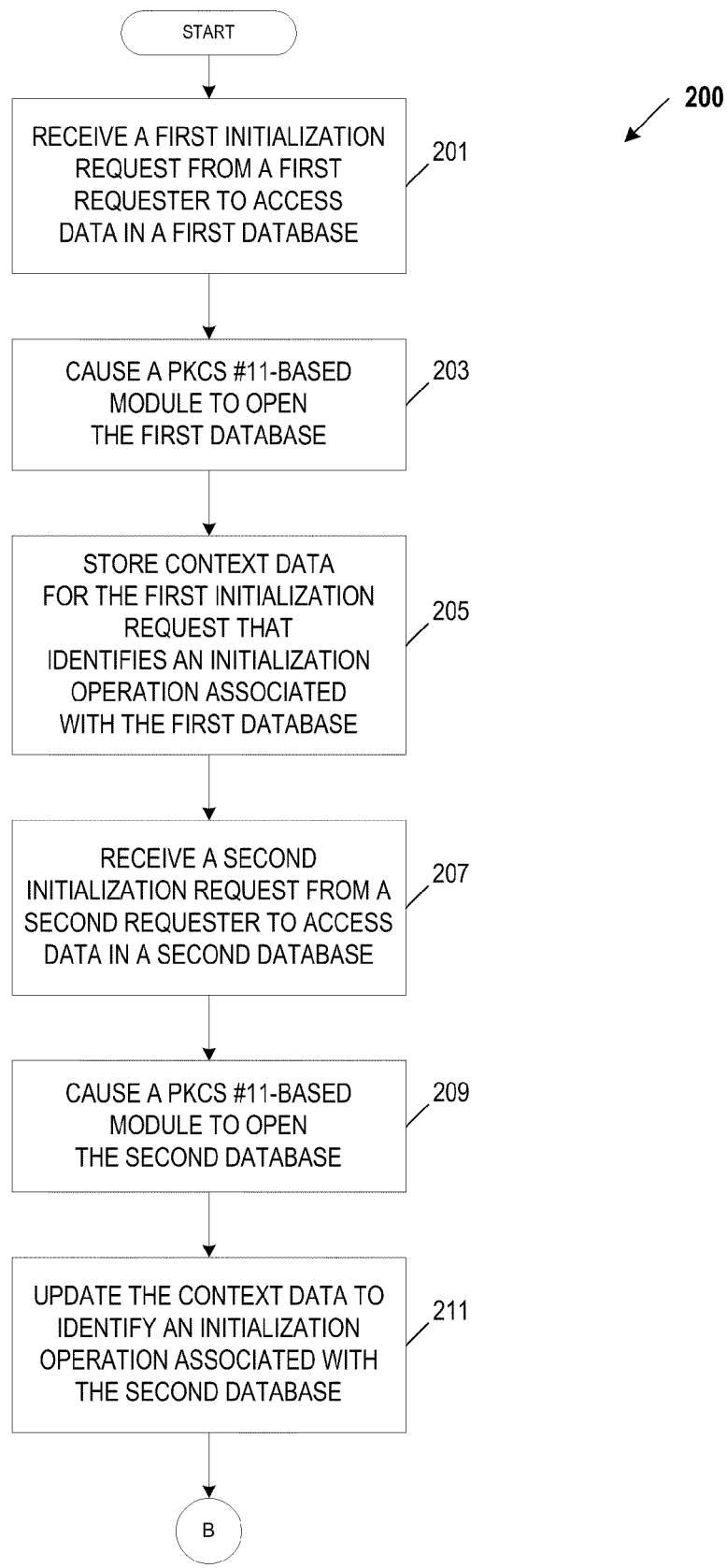
FIGS. 2A and 2B are a flow diagram which illustrates an embodiment of a method for providing network security services to multiple requesters.
Figure 2B:
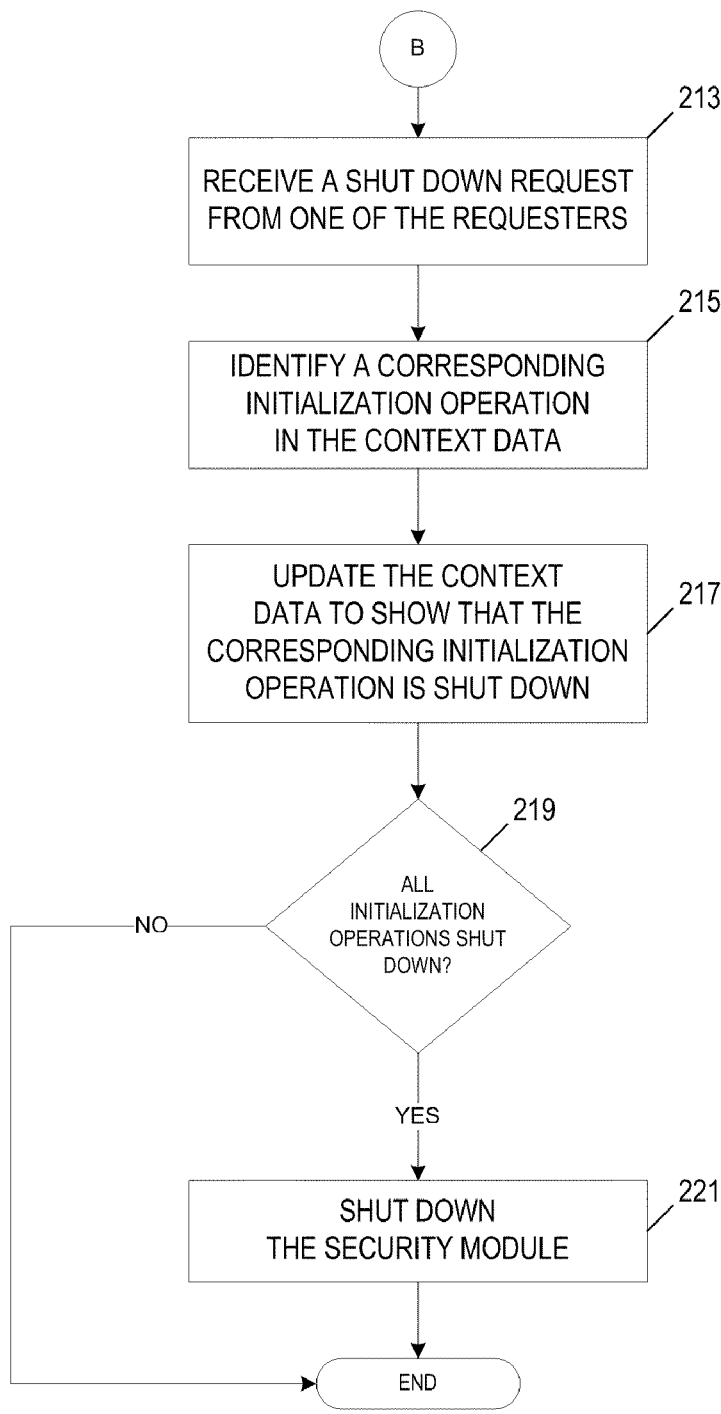

FIGS. 2A and 2B are a flow diagram which illustrates an embodiment of a method 200 for providing network security services to multiple requesters. Method 200 can be performed by processing logic that can comprise hardware (e.g., circuitry, dedicated logic, programmable logic, microcode, etc.), software (e.g., instructions run on a processing device), or a combination thereof. In one embodiment, method 200 is performed by the security initialization system 170 including a multi-initializer 180 in a client machine 103 of FIG. 1.

In one embodiment, the method 200 can be invoked upon the security initialization system receiving a first initialization request from a first requester, such as an application or a library, to access security data in a first database at block 201. Examples of security data can include a key, a certificate, a PEM file, etc. For example, an application may be an email application requesting a key for decrypting an email. At block 203, the initialization system can cause a PKCS-based module to open the first database.

At block 205, the initialization system can generate and store context data for the first initialization request. The context data can include data that identifies an initialization operation that is associated with an open database. An initialization operation can be identified by a unique identifier. The initialization system can store context data in a persistent storage unit.

At block 207, the initialization system can receive a second initialization request from a second requester to access data in a second database. The initialization system may receive a second initialization request from a second requester to access data in the same first database. At block 209, the initialization system can cause a PKCS-based module to open the second database. At block 211, the initialization system can update the context data to identify an initialization operation that is associated with the second database. If the initialization request is a request to open the same first database, the initialization system can add a reference count in the context data associated with the first database.

At block 213, the security initialization system can receive a shut down request from one of the requesters (e.g., an application or a library). A shut down request can indicate that a requester is done accessing security data in the open databases. A shutdown request may include data that identifies the requester, a database, and/or an initialization operation. The shutdown request can include data for identifying a corresponding initialization operation in the context data. For example, an HTTP library may generate an initialization request for access to data which is stored in database-A and subsequently generate a shut down request that includes an indentifier associated the initialization operation to open database-A. A shutdown request may include data that identifies the requester (e.g., an application 150 or a library 175) and/or a database. The security initialization system can determine an initialization operation that corresponds to the shut down request using the database and/or requester information.

At block 215, the initialization system can search the context data to identify a corresponding initialization operation in the context data. The initialization system can search the context data for an initialization identifier that matches an initialization identifier included in the shut down request. At block 217, the initialization system can update the context data to reflect the shut down request. The initialization system can delete the initialization operation data in the context data or can change the initialization operation data to show that it is shut down.

At block 219, the initialization system can determine from the context data whether there are other requesters (e.g., applications or libraries) that are still accessing the open databases. In one embodiment, the open databases can remain open until the initialization system detects that all initialization operations in the context data have been shut down. For example, database-A, database-B, and database-C can remain open until the other requesters (e.g., applications and libraries) each generate and send a shut down request for a corresponding initialization operation.

If the initialization system detects that not all of the initialization operations have been shut down (block 219), the method ends. If the initialization system detects that all initialization operations have been shut down (block 219), the initialization system can shut down the security module at block 221. The initialization system can cause the open databases to close when the security module is shut down. The initialization system can can cause a PKCS-based module to close the open databases.

In another embodiment, the initialization system can close an open database that corresponds to a shut down request. A shutdown request may include data that identifies the requester, a database, and/or an initialization operation. The initialization system can identify an initialization operation used to open a database from the data in the shut down request and can cause the open database associated with the initialization operation to close. For example, the LDAP library may be done accessing security data in the database-B and can generate a shut down request. The initialization system can identify based on data in the shut down request that database-B is to be closed. The initialization system can determine whether all initialization operations for the particular database (e.g., database-B) have corresponding shut down requests. The initialization system can use a reference count in the context data for determining whether all initialization operations for the particular database have corresponding shut down requests. When the initialization system can detects that all initialization operations for the particular database have corresponding shut down requests, the initialization system can cause the open database (e.g., database-B) to close. The initialization system can cause a PKCS-based module to close database-B without shutting down any other open databases.

Figure 3:
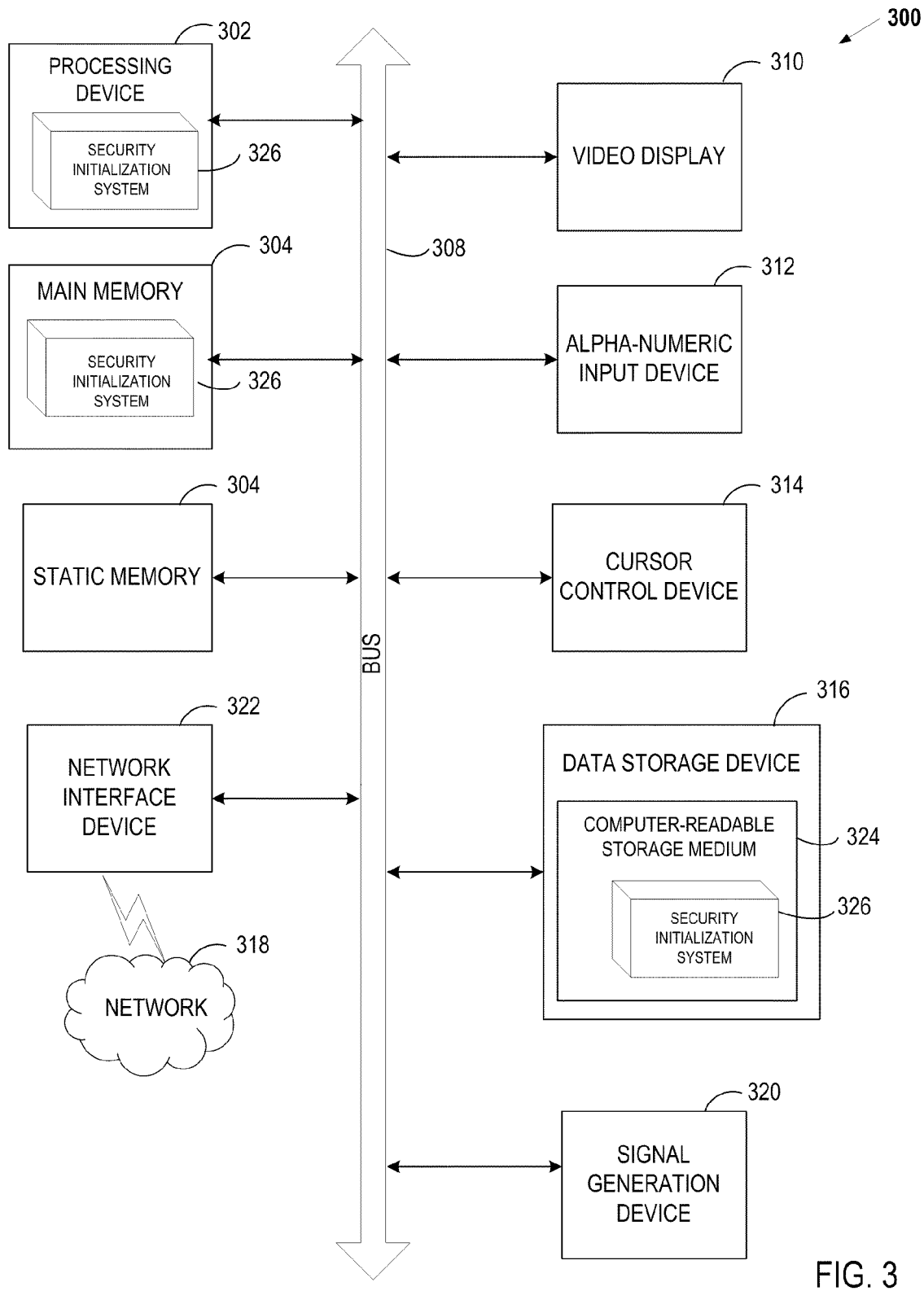
FIG. 3 is a diagram of one embodiment of the security initialization system.

FIG. 3 is a diagram of one embodiment of a computer system for for multi-initialization of networks security services. Within the computer system 300 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 300 includes a processing device 302, a main memory 304 (e.g., read-only memory (ROM), flash memory, dynamic random access memory (DRAM) such as synchronous DRAM (SDRAM) or DRAM (RDRAM), etc.), a static memory 306 (e.g., flash memory, static random access memory (SRAM), etc.), and a secondary memory 316 (e.g., a data storage device in the form of a drive unit, which may include fixed or removable computer-readable storage medium), which communicate with each other via a bus 308.

Processing device 302 represents one or more general-purpose processing devices such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute the security initialization system 326 for performing the operations and steps discussed herein.

The computer system 300 may further include a network interface device 322. The computer system 300 also may include a video display unit 310 (e.g., a liquid crystal display (LCD) or a cathode ray tube (CRT)) connected to the computer system through a graphics port and graphics chipset, an alphanumeric input device 312 (e.g., a keyboard), a cursor control device 314 (e.g., a mouse), and a signal generation device 320 (e.g., a speaker).

The secondary memory 316 may include a machine-readable storage medium (or more specifically a computer-readable storage medium) 324 on which is stored one or more sets of instructions (e.g., the security initialization system 326) embodying any one or more of the methodologies or functions described herein. The security initialization system 326 may also reside, completely or at least partially, within the main memory 304 and/or within the processing device 302 during execution thereof by the computer system 300, the main memory 304 and the processing device 302 also constituting machine-readable storage media. The a security initialization system 326 may further be transmitted or received over a network 318 via the network interface device 322.

The computer-readable storage medium 324 may also be used to store the security initialization system 326 persistently. While the computer-readable storage medium 324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The security initialization system 326, components and other features described herein (for example in relation to FIG. 1) can be implemented as discrete hardware components or integrated in the functionality of hardware components such as ASICS, FPGAs, DSPs or similar devices. In addition, the security initialization system 326 can be implemented as firmware or functional circuitry within hardware devices. Further, the security initialization system 326 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "storing," "updating," "determining," "shutting down," "searching," "removing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for multi-initialization of network security services. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
creating, by a client computing system, context data in response to a first database access request from a first requester to access a first security database storing security data, wherein the context data indicates the first security database is open for the first requester;
modifying the context data in response to a second database access request from a second requester to access a second security database storing security data, wherein the modification indicates the second security database is open for the second requester;
updating the context data to indicate that a database shutdown request to close an open security database is received from one of the requesters, wherein the database shutdown request identifies one of the first requester or the second requester and a security database to be closed; and
determining whether to shutdown a security module that is managing opening of the first security database and the second security database in response to the database shutdown request using the context data.

2. The method of claim 1, wherein the security module is a module to provide network security services.

3. The method of claim 1, wherein the first requester and the second requester is at least one of an application or a library.

4. The method of claim 3, wherein the application is at least one of a web browsing application, a cryptography application, or an email application.

5. The method of claim 3, wherein the library is a library to perform at least one of HTTP operations or lightweight data access protocol (LDAP) operations.

6. The method of claim 1, wherein updating the context data comprises:
searching the context data for an initialization operation that corresponds to the database shutdown request; and
changing the context data for the corresponding initialization operation.

7. The method of claim 6, wherein searching the context data comprises:
searching the context data for an initialization operation identifier that matches an initialization operation identifier in the database shutdown request.

8. The method of claim 1, wherein the database shutdown request comprises at least one of data identifying a requester, data identifying a database, or an initialization operation identifier.

9. The method of claim 1, wherein determining whether a security module is to be shutdown comprises:
determining that all of the open security database as represented in the context data have a corresponding database shutdown request.

10. A system comprising:
a persistent storage unit coupled to a client to store context data for a plurality of database access requests from a plurality of requesters to access a plurality of security databases storing security data, the context data indicating that a security database is open for a corresponding requester and indicating that a database shutdown request to close an open security database is received from one or more of the plurality of requesters; and
a client to receive a first database access request from a first requester of the plurality of requesters to access a first security database of the plurality of security databases, receive a second database access request from a second requester to access a second security database, receive a database shutdown request from one of the requesters, wherein the database shutdown request identifies one of the first requester or the second requester and a security database to be closed, update the context data to indicate at least one of the first security database is open for the first requester or the second security database is open for the second requester, and determine whether to shutdown a security module that is managing opening of the first security database and the second security database in response to the database shutdown request using the context data.

11. The system of claim 10, wherein the security module is a module to provide network security services.

12. The system of claim 10, wherein the first requester and the second requester is at least one of an application or a library.

13. The system of claim 10, wherein the client is to update the context data by:
   searching the context data for an initialization operation that corresponds to the database shutdown request; and
   changing the context data for the corresponding initialization operation.

14. A non-transitory computer-readable storage medium including instructions that, when executed by a computer system, cause the computer system to perform a set of operations comprising:
   creating context data in response to a first a database access request from a first requester to access a first security database storing security data, wherein the context data indicates the first security database is open for the first requester;
   modifying the context data in response to a second database access request from a second requester to access a second security database storing security data, wherein the modification indicates the second security database is open for the second requester;
   updating the context data to indicate that a database shutdown request to close an open security database is received from one of the requesters, wherein the database shutdown request identifies one of the first requester or the second requester and a security database to be closed; and
   determining whether to shutdown a security module that is managing opening of the first security database and the second security database in response to the database shutdown request using the context data.

15. The non-transitory computer-readable storage medium of claim 14, wherein the security module is a module to provide network security services.

16. The non-transitory computer-readable storage medium of claim 14, wherein the first requester and the second requester is at least one of an application or a library.

17. The non-transitory computer-readable storage medium of claim 16, wherein the application is at least one of a web browsing application, a cryptography application, or an email application.

18. The non-transitory computer-readable storage medium of claim 16, wherein the library is a library to perform at least one of HTTP operations or lightweight data access protocol (LDAP) operations.

19. The non-transitory computer-readable storage medium of claim 14, wherein updating the context data comprises:
   searching the context data for an initialization operation that corresponds to the database shutdown request; and
   changing the context data for the corresponding initialization operation from the context data.

20. The non-transitory computer-readable storage medium of claim 14, wherein the database shutdown request comprises at least one of data identifying a requester, data identifying a database, or an initialization operation identifier.

* * * * *